United States Patent
Weinfield

(10) Patent No.: US 10,319,231 B2
(45) Date of Patent: Jun. 11, 2019

(54) SYSTEM AND METHOD FOR PROVIDING DRIVER WITH PRELIMINARY NOTIFICATION

(71) Applicant: DENSO International America, Inc., Southfield, MI (US)

(72) Inventor: Aaron Weinfield, Encinitas, CA (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 15/616,215

(22) Filed: Jun. 7, 2017

(65) Prior Publication Data
US 2018/0357897 A1     Dec. 13, 2018

(51) Int. Cl.
*G08G 1/0967*  (2006.01)
*B60W 50/14*   (2012.01)
*B60W 50/00*   (2006.01)
*G08G 1/0962*  (2006.01)
*G08G 1/00*    (2006.01)

(52) U.S. Cl.
CPC ... *G08G 1/096791* (2013.01); *B60W 50/0097* (2013.01); *B60W 50/14* (2013.01); *G08G 1/09623* (2013.01); *G08G 1/096716* (2013.01); *G08G 1/096758* (2013.01); *G08G 1/22* (2013.01)

(58) Field of Classification Search
CPC .............................................. G08G 1/096791
See application file for complete search history.

(56) References Cited

U.S. PATENT DOCUMENTS

| | | | |
|---|---|---|---|
| 2005/0088318 A1* | 4/2005 | Liu | G08G 1/0965 340/902 |
| 2013/0278441 A1* | 10/2013 | Rubin | G08G 9/02 340/905 |
| 2015/0244459 A1* | 8/2015 | Lindsay | H04B 10/1123 398/130 |
| 2016/0076207 A1* | 3/2016 | Moran | E01F 9/30 340/905 |
| 2016/0272113 A1* | 9/2016 | Lopez-Hinojosa | B60Q 9/00 |
| 2017/0206788 A1* | 7/2017 | Hu | G08G 1/162 |

* cited by examiner

*Primary Examiner* — Joseph H Feild
*Assistant Examiner* — Pameshanand Mahase

(57) ABSTRACT

The present disclosure provides a system for providing a driver of a host vehicle being stopped with a preliminary notification that remote vehicles forming a queue in front of the host vehicle are likely to start moving. The system includes a receiver, a notifying device, a determiner, and a controller. The receiver is configured to receive messages from the remote vehicles through Vehicle-to-Vehicle (V2V) communications. The notifying device is configured to provide the driver with the preliminary notification. The determiner is configured to determine whether a specified vehicle among the remote vehicles other than a preceding vehicle directly ahead of the specified vehicle starts moving based on the messages sent from the specified vehicle. The controller is configured to control the notifying device to provide the preliminary notification when the determiner determines that the specified vehicle starts moving.

20 Claims, 7 Drawing Sheets

SYSTEM AND METHOD FOR PROVIDING DRIVER WITH PRELIMINARY NOTIFICATION

TECHNICAL FIELD

The present disclosure relates to a system and a method for providing a driver with a preliminary notification that remote vehicles forming a queue in front of the host vehicle are likely to start moving.

BACKGROUND

Drivers spend a lot of time to wait in a long queue before being able to proceed after a traffic light turns green or in normal stop. After being stopped, often the first car in the queue begins to move and the second car waits a few seconds before moving, and then the third car waits a few seconds, and so on. This causes a large delay before the vehicle at the end of the queue can start to move.

In some cases, vehicles cannot see other vehicles in front because their view is blocked by obstacles or drivers are just not paying attention to the traffic. This results in a larger time-gap before each vehicle begins to move.

In view of the above, it is an object of the present disclosure to provide a system that is able to properly provide a preliminary notification to a driver of a host vehicle when remote vehicles in front of the host vehicle are likely to start moving.

It is another object of the present disclosure to provide a method that is able to properly provide a preliminary notification to a driver of a host vehicle when remote vehicles in front of the host vehicle are likely to start moving.

SUMMARY

This section provides a general summary of the disclosure, and is not a comprehensive disclosure of its full scope or all of its features.

A first aspect of the present disclosure provides a system for providing a driver of a host vehicle being stopped with a preliminary notification that remote vehicles forming a queue in front of the host vehicle are likely to start moving. The system includes a receiver, a notifying device, a determiner, and a controller. The receiver is configured to receive messages from the remote vehicles through Vehicle-to-Vehicle (V2V) communications. The notifying device is configured to provide the driver with the preliminary notification. The determiner is configured to determine whether a specified vehicle among the remote vehicles other than a preceding vehicle directly ahead of the specified vehicle starts moving based on the messages sent from the specified vehicle. The controller is configured to control the notifying device to provide the preliminary notification when the determiner determines that the specified vehicle starts moving.

A second aspect of the present disclosure provides a method for providing a driver of a host vehicle being stopped with a preliminary notification that remote vehicles forming a queue in front of the host vehicle are likely to start moving. The method includes (i) receiving, with a receiver, messages from the remote vehicles through Vehicle-to-Vehicle (V2V) communications, (ii) determining, with a determiner, whether a specified vehicle among the remote vehicles other than a preceding vehicle directly ahead of the specified vehicle starts moving based on the messages sent from the specified vehicle, and (iii) controlling, with a controller, a notifying device to provide the preliminary notification when the determiner determines that the specified vehicle starts moving.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In the drawings.

DETAILED DESCRIPTION

Figure 1:
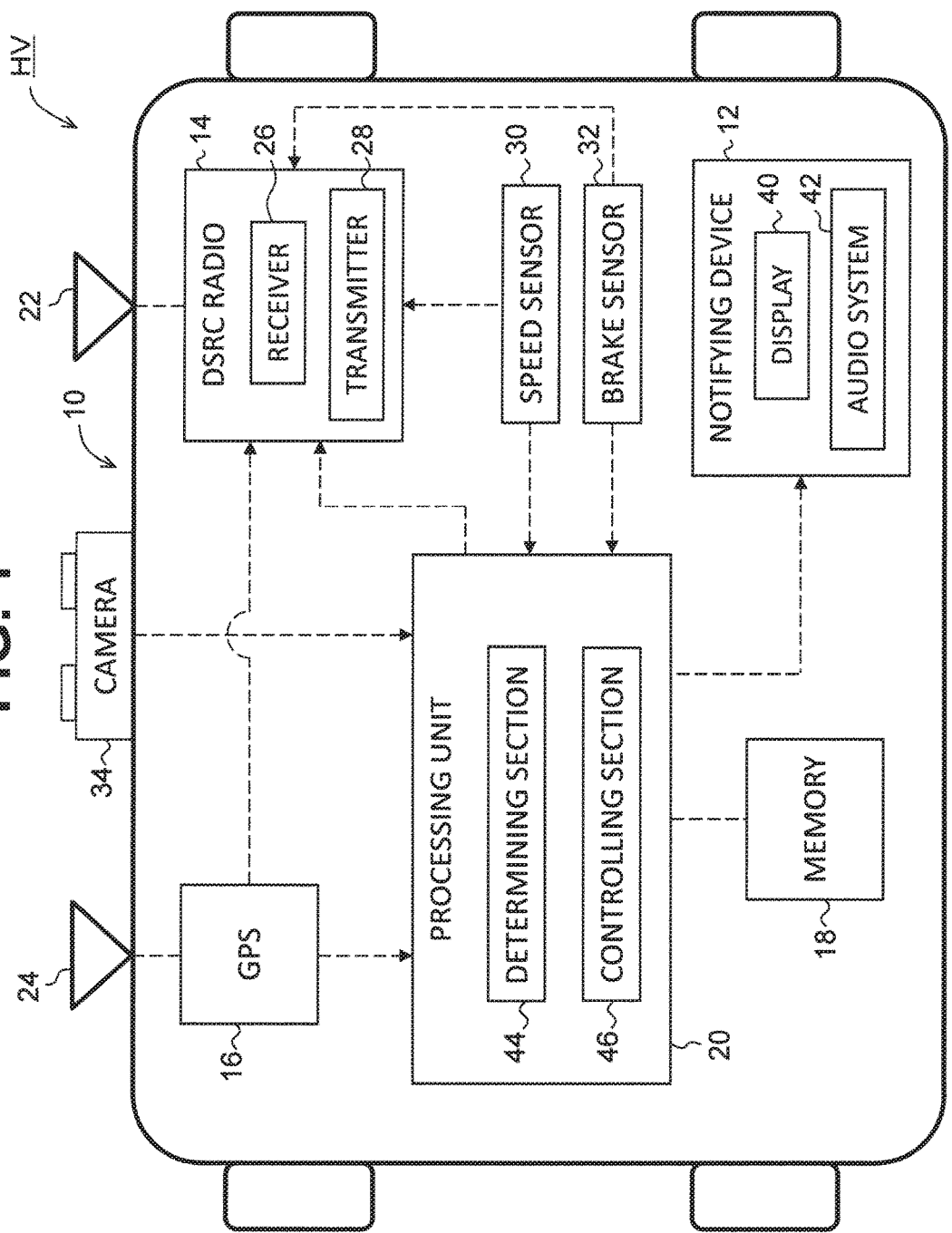
FIG. 1 is a block diagram of a DSRC system according to a first embodiment.

As follows, a plurality of embodiments of the present disclosure will be described with reference to drawings. It will be apparent to those skilled in the art from this disclosure that the following descriptions of the embodiments are provided for illustration only and not for the purpose of limiting the invention as defined by the appended claims and their equivalents. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts may be combined. The embodiments may be partially combined even if it is not explicitly described that the embodiments may be combined, provided there is no harm in the combination.

In the following description, a system and a method for providing a driver with a preliminary notification will be described by being implemented as a dedicated short range communications (DSRC) system. However, any type of Vehicle-to-Vehicle (V2V) communications which allow a host vehicle HV to communicate with other remote vehicles may be used for the present disclosure.

First Embodiment

FIG. 1 is a block diagram illustrating the DSRC system 10 mounted to a host vehicle HV. The DSRC system 10 generally includes a DSRC radio 14, a global positioning system (GPS) 16, a notifying device 12, a memory 18, and a processing unit (a controller) 20. In the present embodiment, the DSRC system 10 also includes a camera 34 as a sensor. The host vehicle HV is also equipped with a DSRC antenna 22 and a GPS antenna 24 that are attached to, e.g., a windshield or roof of the host vehicle HV.

The DSRC radio 14 is configured to transmit and receive basic safety messages (BSMs) to/from remote vehicles RV that are also equipped with similar DSRC systems (i.e., Vehicle-to-Vehicle (V2V) communication systems). The DSRC radio 14 can also transmit and receive BSMs to/from infrastructures (not shown) equipped with a V2X (Vehicle-to-Infrastructure) system.

More specifically, the DSRC radio 14 includes a receiver 26 and a transmitter 28, both of which are connected to the DSRC antenna 22. The receiver 26 serves to receive BSMs transmitted from remote vehicles RV and/or infrastructures through the DSRC antenna 22, whereas the transmitter 28 serves to transmit BSMs from the host vehicle HV through the DSRC antenna 22. The receiver 26 receives packets of BSMs from remote vehicles RV and/or infrastructures, and the transmitter 28 transmits packets of BSMs from the host vehicle HV.

In this way, the DSRC radio 14 communicates with remote vehicles RV and infrastructures through packets transmission. The transmitter 28 transmits packets of BSMs at a specified rate (e.g., 10 Hz). It should be noted that DSRC systems mounted to remote vehicles RV also communicate with the host vehicle HV through packets transmission. Therefore, as with the host vehicle HV, each of the DSRC systems of remote vehicles RV transmits packets of BSMs.

As shown in FIG. 1, the DSRC radio 14 is connected to a speed sensor 30 and a brake sensor 32 that are mounted to the host vehicle HV. The speed sensor 30 is configured to detect vehicle speed of the host vehicle HV. The speed sensor 30 transmits the vehicle speed as "speed information" to the DSRC radio 14. The brake sensor 32 is configured to detect brake status of the host vehicle HV. More specifically, the brake sensor 32 is electrically connected to a brake system (not shown) of the host vehicle HV and senses whether the brake system is on (i.e., braking status) or off (i.e., non-braking status). The brake sensor 32 transmits the brake status detected as "brake status information" of the host vehicle HV to the DSRC radio 14. As shown in FIG. 1, the speed sensor 30 and the brake sensor 32 are also connected to the processing unit 20. The vehicle speed detected by the speed sensor 30 and the brake status detected by the brake sensor 32 are transmitted to the processing unit 20.

The GPS 16 is connected to the GPS antenna 24 to receive positional information of the host vehicle HV from a GPS satellite (not shown). The positional information includes a latitude and a longitude of the host vehicle HV. The positional information also includes a position determination time corresponding to when the position of the host vehicle HV is determined. The GPS 16 transmits the positional information to the DSRC radio 14. The GPS 16 is also connected to the processing unit 20, and the positional information is transmitted to the processing unit 20 from the GPS 16.

In this way, the DSRC radio 14 inputs the positional information, the speed information, and the brake status information. Then, the DSRC radio 14 (the transmitter 28) transmits BSMs containing the positional information, the speed information, and the brake status information to remote vehicles RV and/or infrastructures. Likewise, BSMs transmitted from remote vehicles RV also contain at least positional information (including the position determination time), speed information, and brake status information concerning the remote vehicles RV.

The camera 34 is an on-board camera such as a Flea3® camera. The camera 34 is mounted on, e.g., the windshield of the host vehicle HV to optically capture images of a scene ahead of the vehicle 12. For example, the camera 34 has a frame rate of 15 FPS. Especially, when the host vehicle HV reaches an intersection having a traffic light 38, the camera 34 captures images of the traffic light 38. The camera 34 has preferably 50 m of maximum recognition range, at which the camera 34 is able to recognize the traffic light color. The camera 34 is connected to the processing unit 20 through an Ethernet network and images captured by the camera 34 are transmitted to the processing unit 20.

The notifying device 12 is a device to notify a driver of the host vehicle HV of a variety kinds of notifications. In the present embodiment, the notifying device 12 includes a display 40 and an audio system 42. The display 40 is a device visually provides information to the driver. The display 40 can be any type of display devices such as a liquid crystal display (LCD), an electroluminescent display (ELD), or the like. The display 40 may be disposed in a dashboard in a passenger compartment. Alternatively, the display 40 may be integrally formed with a meter cluster in front of the driver seat. The display 40 is electrically connected to the processing unit 20, and the processing unit 20 controls the display 40 to show visual images including a preliminary notification image and an actual notification image, both of which will be described in detail later.

The audio system 42 is configured to generate sounds to the driver. The audio system 42 may be any type of vehicle audio equipment. The audio system 42 is electrically connected to the processing unit 20, and the processing unit 20 controls the audio system 42 to generate sounds including an additional notification sound, which will be described later.

The memory 18 may include a random access memory (RAM) and read-only memory (ROM). The memory 18 may store computer-readable, computer-executable software code (i.e., programs) containing instructions that are executed by the processing unit 20 to perform various functions described herein. The memory 18 also temporarily stores BSMs received from remote vehicles RV and infrastructures. More specifically, the memory 18 stores packets of BSMs in a structure pointed (or referenced) by a temporary ID that is uniquely assigned to respective remote vehicles RV. Therefore, packets of BSMs having a temporary ID value and packets of BSMs having a different temporary ID value are separately stored in structures defined in the memory 18. As a result, the system 10 can separately recognize each BSM in association with a corresponding remote vehicle RV.

FIG. 1 shows the processing unit 20 formed of functionally defined blocks. Although the processing unit 20 is described herein and depicted in drawings as one component, the processing unit 20 is conceptually represented as one block formed of main functions of the system, and actual processors performing these functions may be separately disposed or arranged in the system 10. The processing unit 20 functionally includes a determining section 44 (a determiner) and a controlling section 46 (a controller). As described below, the determining section 44 and the controlling section 46 are programmed to perform each function when the host vehicle HV stops at an intersection having a traffic light 38 and the traffic light 38 is red (i.e., the vehicle speed is zero or the brake status is non-braking status, and the traffic light color captured by the camera 34 is red).

Figure 2:
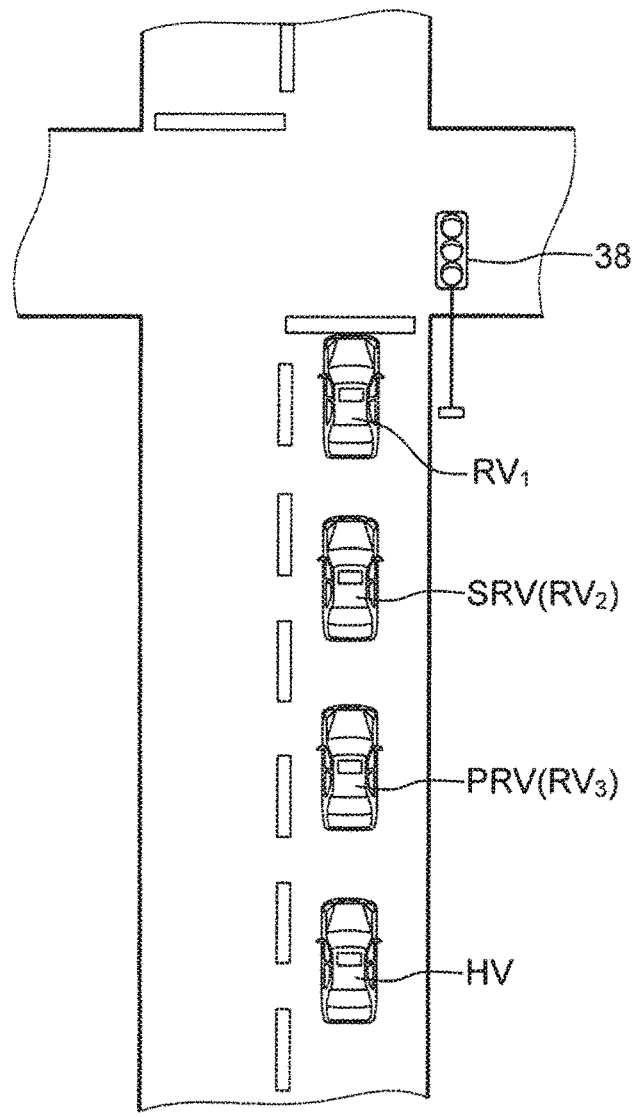
FIG. 2 is an exemplary situation where a host vehicle stops in a queue formed of remote vehicles according to the first embodiment.

To describe the functions performed by the determining section 44 and the controlling section 46, it is assumed one exemplary situation illustrated in FIG. 2. In the assumed situation, the host vehicle HV stops in a queue before an intersection having a traffic light 38 and the queue is formed of a plurality of remote vehicles RV and the host vehicle HV. The remote vehicle RV directly ahead of the host vehicle HV is defined as a "preceding vehicle PRV". In the assumed situation, each of the remote vehicles RV including the preceding vehicle PRV is equipped with an own DSRC system. Thus, each remote vehicle RV can communicate with each other and the host vehicle HV.

The determining section 44 is configured to determine whether a specified vehicle SRV among the remote vehicles RV other than the preceding vehicle PRV starts moving. In the present embodiment, the specified vehicle SRV is one of the remote vehicles RV that is directly ahead of the preceding vehicle PRV. More specifically, the determining section 44 is configured to order all the remote vehicles RV by distance from the front vehicle (i.e., the furthest vehicle from the front vehicle) in the queue to the preceding vehicle PRV (i.e., ordering each remote vehicle RV as $RV_1, \ldots RV_{N-1}, RV_N$). The distance from the host vehicle HV to each remote vehicle RV can be obtained based on the positional information contained in the BSMs transmitted from each remote vehicle RV. Then, the determining section 44 identifies the remote vehicle $RV_{N-1}$ (i.e., $RV_2$ in this example) as the specified vehicle SRV and the remote vehicle $RV_N$ (i.e., $RV_3$ in this example) as the preceding vehicle PRV.

The determining section 44 determines whether the specified vehicle SRV starts moving based on the BSMs transmitted from the specified vehicle SRV. More specifically, the determining section 44 monitors the brake status information and the vehicle speed information contained in the BSMs transmitted from the specified vehicle SRV. Then, if the brake status changes from the braking status to the non-braking status or the vehicle speed is greater than zero, the determining section 44 determines that the specified vehicle SRV starts moving. When the determining section 44 determines that the specified vehicle SRV starts moving, the determining section 44 is configured to output a first signal to the controlling section 46.

The determining section 44 is further configured to determine, after determining that the specified vehicle SRV starts moving, whether the preceding vehicle PRV starts moving. In the present embodiment, the determining section 44 determines the start of the preceding vehicle PRV based on the BSMs transmitted from the preceding vehicle PRV. That is, the determining section 44 monitors the brake status information or the vehicle speed information contained in the BSMs of the preceding vehicle PRV. Then, if the brake status changes from the braking status to the non-braking status or the vehicle speed is greater than zero, the determining section 44 determines that the preceding vehicle PRV starts moving. When the determining section 44 determines that the preceding vehicle PRV starts moving, the determining section 44 is configure to output a second signal to the controlling section 46.

The determining section 44 is further configured to determine, after determining that the preceding vehicle PRV starts moving, whether the host vehicle HV has not moved for a specified time period since the determining section 44 outputted the second signal to the controlling section 46. For example, the specified time period may be set to 2 or 3 seconds. More specifically, the determining section 44 monitors the vehicle speed detected by the speed sensor 30 and the brake status detected by the brake sensor 32 of the host vehicle HV. The determining section 44 is configured to start measuring elapsed time upon outputting the second signal. Then, when the elapsed time becomes the specified time period, the determining section 44 is configured to output a third signal to the controlling section 46.

The controlling section 46 is configured to control the notifying device 12 to perform a preliminary notification, an actual notification, and an additional notification. More specifically, the controlling section 46 controls the display 40 to show the preliminary notification image, as the preliminary notification, on a screen of the display 40 when the controlling section 46 receives the first signal. The preliminary notification image is an image notifying the driver that traffic (i.e., the queue formed of the remote vehicles RV) is going to move. The preliminary notification image may be also an image to have the driver prepare to start. For example, the preliminary notification image may be messages displayed on the screen. The preliminary notification image may also include an illustration or animation displayed on the screen.

The controlling section 46 is further configured to control the display 40 to show the actual notification image, as the actual notification, on the screen when the controlling section 46 receives the second signal. The actual notification image is an image notifying the driver that the traffic is moving. The actual notification image may be also an image notifying the driver that the driver should start moving. Similar to the preliminary notification image, the actual notification image may be messages and/or an illustration or animation displayed on the screen.

The controlling section 46 is further configured to control the audio system 42 to generate the additional notification sound, as the additional notification, to the driver. The additional notification sound is a sound notifying the driver that the traffic has moved and the driver should start moving. The additional notification sound may be voice messages prompting the drive to start. The additional notification sound may be a beep prompting the driver to start. It should be noted that because once a driver is alerted, the driver would be paying attention again for some brief time. Therefore, execution time for the additional notification sound may be set to a certain time period (e.g., from 1 to 200 seconds) so as to prevent the driver from being annoyed.

Next, operation of the DSRC system 10 according to the present embodiment will be described below with reference to FIG. 3. The DSRC system 10 (the processing unit 20) repeatedly performs the operation shown in the flowchart of FIG. 3 when (i) a traffic light 38 is red if there is the traffic light 38 and (ii) the host vehicle HV is stopped. In the following description, it is assumed that the host vehicle HV stops in a queue formed of the remote vehicle RV as described above and shown in FIG. 2.

When the DSRC radio 14 receives packets of BSMs from the remote vehicles RV at Step 10, the determining section 44 orders all the remote vehicles RV by distance based on the positional information contained in the BSMs at Step 20. Then, the determining section 44 identifies the remote vehicle $RV_N$ directly ahead of the host vehicle HV as the preceding vehicle PRV and the remote vehicle $RV_{N-1}$ directly ahead of the preceding vehicle PRV as the specified vehicle SRV at Step 30.

At Step 40, the determining section 44 determines whether the specified vehicle SRV starts moving based on the BSMs sent from the specified vehicle SRV. In other words, the determining section 44 monitors whether the brake status changes to the non-braking status from the braking status based on the brake status information or the vehicle speed is greater than zero based on the vehicle speed information. If false at Step 40, the determining section 44 repeats Step 40 until the specified vehicle SRV starts moving. If true at Step 40, i.e., the brake status changes to the non-braking status or the vehicle speed is greater than zero, the determining section 44 determines that specified vehicle SRV starts moving and outputs the first signal to the controlling section 46 at Step 50.

At Step 60, the controlling section 46 controls the display 40 to show the preliminary notification image on the screen. By showing the preliminary notification image, such as a message notifying the driver that the traffic in the queue is going to move, the driver is able to recognize the traffic is likely soon to move, and therefore the driver is able to prepare to start.

Next, the determining section 44 determines whether the preceding vehicle PRV starts moving at Step 70 by monitoring the brake status information and the vehicle speed information contained in the BSMs sent from the preceding vehicle PRV. Then, if the brake status changes from the braking status to the non-braking status or the vehicle speed is greater than zero (Step 70: Yes), the determining section 44 determines that the preceding vehicle PRV starts moving. Then, the determining section 44 outputs the second signal to the controlling section 46 at Step 80. In contrast, if false at Step 70, the determining section 44 repeats Step 70 until the preceding vehicle PRV starts moving.

When the controlling section 46 receives the second signal, the controlling section 46 controls the display 40 to show the actual notification image on the screen at Step 90. By showing the actual notification image, such as a message notifying the driver that the traffic is moving, the driver can be prompted to start moving.

The determining section 44 measures elapsed time after outputting the second signal to the controlling section 46 (i.e., after the controlling section 46 controls the display 40 to display 40 the actual notification image). Then, the determining section 44 determines at Step 100 whether the host vehicle HV has not moved for the specified time period by monitoring the vehicle speed detected by the speed sensor 30 or the brake status detected by the brake sensor 32. If the host vehicle HV starts moving within the specified time period (Step 100: No), the process terminates. On the contrary, if the host vehicle HV has not started moving for the specified time period (Step 100: Yes), the determining section 44 outputs the third signal to the controlling section 46 at Step 110.

When the controlling section 46 receives the third signal, the controlling section 46 controls the audio system 42 to generate the additional notification sound at Step 120. By generating the additional notification sound, such as a voice sound prompting the drive to start moving, the driver is able to recognize the traffic has been already moving and immediately starts moving. After the additional notification sound is released, the process terminates.

As described above, the DSRC system 10 is configured to determine whether the specified vehicle SRV starts moving using the BSMs. Then, the DSRC system 10 notifies the driver that the traffic (the queue) is going to move upon determining that the specified vehicle SRV starts moving. Therefore, the driver is able to prepare to start, and thus the host vehicle HV can move upon detection of movement of the preceding vehicle PRV without substantial delay.

The DSRC system 10 can recognize the movement of the specified vehicle SRV that is the remote vehicle RV directly ahead of the preceding vehicle PRV. Thus, even if the preceding vehicle PRV has great height, and therefore the preceding vehicle PRV blocks the driver's view of the specified vehicle SRV, the DSRC system 10 still can recognize the movement of the specified vehicle SRV and provide notification to the driver.

Second Embodiment

Figure 4:
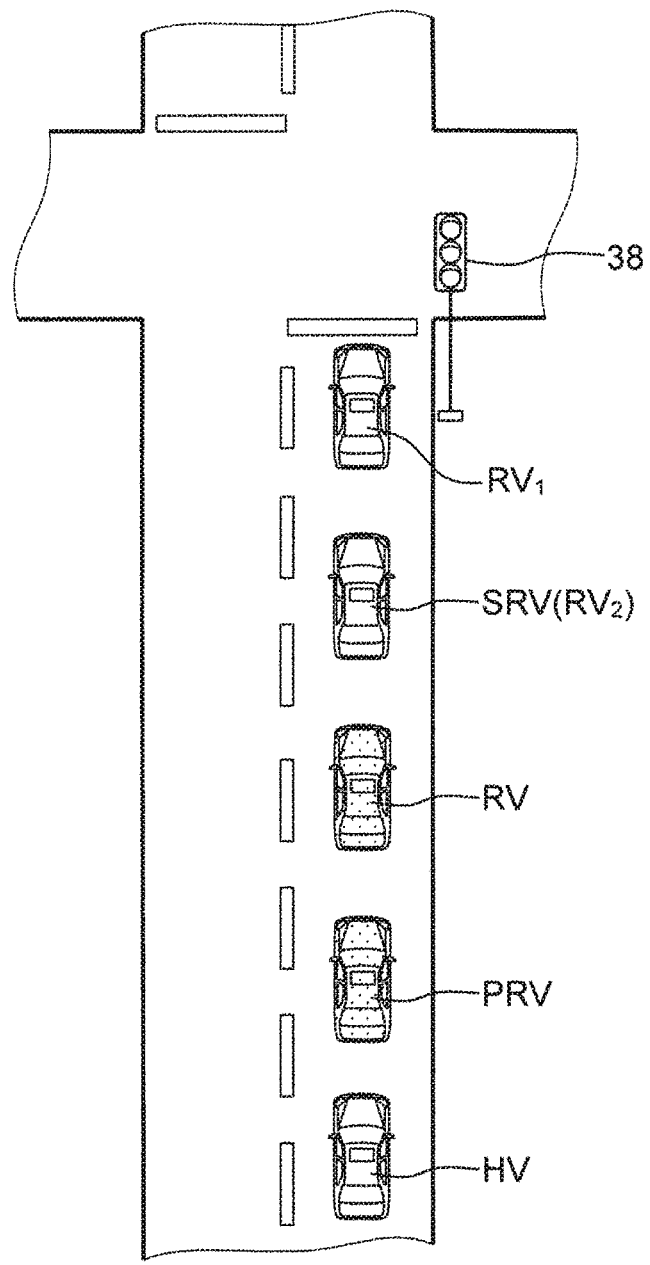
FIG. 4 is an exemplary situation where a host vehicle stops in a queue formed of connected vehicles and non-connected vehicles according to the second embodiment.

In the first embodiment, the remote vehicles RV including the preceding vehicle PRV are assumed to have their own DSRC system. In this embodiment, it is assumed that some of the remote vehicles RV have own their DSRC systems, while the other remote vehicles RV do not have own DSRC systems. Hereinafter, the remote vehicles RV each having a DSRC system and capable of communicating with the host vehicle HV are referred to as "connected vehicles RV", whereas the remote vehicles RV each not having a DSRC system and incapable of communicating with the host vehicle HV are referred to as "non-connected vehicles RV". In the following description, a situation is assumed where the host vehicle HV stops in a queue formed of two connected vehicles RV and two non-connected vehicles RV, as shown in FIG. 4. The preceding vehicle PRV directly ahead of the host vehicle HV is assumed to be one of the two non-connected vehicles RV. FIG. 4 illustrates the non-connected vehicles RV with shadows.

In this situation, the host vehicle HV is able to communicate with only the two front remote vehicles RV via the V2V communications. Therefore, the host vehicle HV identifies the preceding vehicle PRV using the camera 34 instead of using BSMs. In other words, the host vehicle HV optically recognizes the preceding vehicle PRV based on images captured by the camera 34. In the present embodiment, the specified vehicle SRV is defined as "one of the connected vehicles RV that is closest to the host vehicle HV". More specifically, the determining section 44 is configured to order all the connected vehicles RV by distance from the front remote vehicle RV (i.e., ordering $RV_1$ and $RV_2$ in this example). Then, the determining section 44 identifies the connected vehicle RV having the biggest order (i.e., "$RV_2$" in this example) as the specified vehicle SRV. Then, the determining section 44 monitors the specified vehicle SRV in the same way as the first embodiment.

Furthermore, in the present embodiment, the determining section 44 monitors the preceding vehicle PRV based on images captured by the camera 34. That is, the determining section 44 determines whether the preceding vehicle PRV starts moving based on the captured images of the preceding vehicle PRV. The determining section 44 may determine whether the preceding vehicle PRV starts moving by, for example, tracking two or more image frames. Then, if the determining section 44 determines that the preceding vehicle PRV starts moving, the determining section 44 outputs the second signal to the controlling section 46 (i.e., the actual notification is performed).

Next, operation of the DSRC system 10 according to the second embodiment will be described below with reference to FIG. 5. As with the first embodiment, the DSRC system 10 repeatedly performs the operation shown in the flowchart of FIG. 5 when (i) a traffic light 38 is red if there is the traffic light 38 and (ii) the host vehicle HV is stopped.

When the host vehicle HV stops in a queue before a traffic light 38 with a red color, the camera 34 detects the preceding vehicle PRV at Step 200. The capture images are transmitted to the processing unit 20. The determining section 44 identifies the preceding vehicle PRV based on the captured images by the camera 34 at Step 210. Then, the determining section 44 orders all the connected vehicles based on the positional information contained in the BSMs at Step 220. Next, the determining section 44 identifies the connected vehicle $RV_2$ having the biggest order (i.e., the closest vehicle among the connected vehicles RV) as the specified vehicle SRV at Step 230.

At Step 240, the determining section 44 determines whether the specified vehicle SRV starts moving based on the BSMs sent from the specified vehicle SRV. If false at Step 240, the determining section 44 repeats Step 240 until the specified vehicle SRV starts moving. If true at Step 240, i.e., the brake status changes to the non-braking status or the vehicle speed is greater than zero, the determining section 44 determines that specified vehicle SRV starts moving and outputs the first signal to the controlling section 46 at Step 250.

At Step 260, the controlling section 46 controls the display 40 to display the preliminary notification image on the screen as with the first embodiment. Next, the determining section 44 determines whether the preceding vehicle PRV starts moving at Step 270 based on the captured images detected by the camera 34. If the determining section 44 determines that the preceding vehicle PRV starts moving, the determining section 44 outputs the second signal to the controlling section 46 at Step 280. In contrast, if false at Step 270, the determining section 44 repeats Step 270 until the preceding vehicle PRV starts moving.

When the controlling section 46 receives the second signal, the controlling section 46 controls the display to display 40 the actual notification image on the screen at Step 290. The determining section 44 measures elapsed time after outputting the second signal to the controlling section 46. Then, the determining section 44 determines whether the host vehicle HV has not moved for the specified time period by monitoring the vehicle speed or the brake status at Step 300. If the host vehicle HV starts moving within the specified time period (Step 300: No), the process terminates. On the contrary, if the host vehicle HV has not started moving for the specified time period (Step 300: Yes), the determining section 44 outputs the third signal to the controlling section 46 at Step 310. When the controlling section 46 receives the third signal, the controlling section 46 controls the audio system 42 to generate the additional notification sound at Step 320. After the additional notification sound is released, the process terminates.

As described above, the DSRC system 10 according to the second embodiment notifies the driver when the traffic (the queue) is going to move as with the first embodiment. Therefore, the driver is able to prepare to start, and thus the host vehicle HV can move upon movement of the preceding vehicle PRV without substantial delay.

Furthermore, the determining section 44 according to the second embodiment is configured to identify the preceding vehicle PRV based on the captured images by the camera 34. Therefore, the DSRC system 10 can monitor the preceding vehicle PRV even when the preceding vehicle PRV is not equipped with a DSRC system.

Third Embodiment

Figure 6:
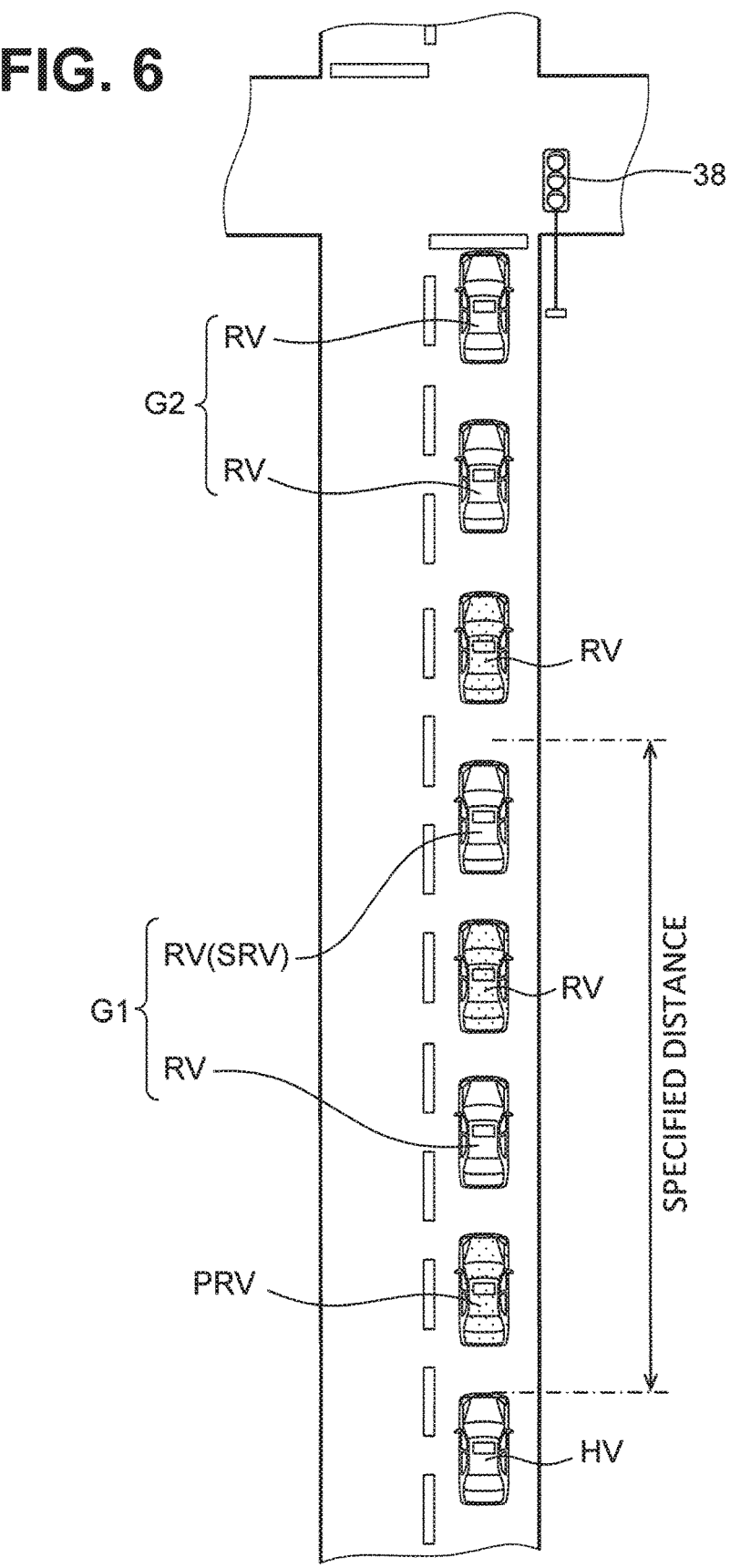
FIG. 6 is an exemplary situation where a host vehicle stops in a queue formed of connected vehicles and non-connected vehicles according to the third embodiment.

In the third embodiment, it is assumed that some of the remote vehicles RV have own DSRC systems (i.e., connected vehicles RV), while the other remote vehicles RV do not have own DSRC systems (i.e., non-connected vehicles RV), similar to the second embodiment. Furthermore, in the following description, a situation is assumed where the host vehicle HV stops in a queue formed of four connected vehicles RV and three non-connected vehicles RV as shown in FIG. 6. The preceding vehicle PRV directly ahead of the host vehicle HV is one of the three non-connected vehicles RV. Therefore, as with the second embodiment, the preceding vehicle PRV is recognized by the determining section 44 based on captured images detected by the camera 34. As with the second embodiment, the three non-connected vehicles are illustrated with shadows in FIG. 6.

In this embodiment, the determining section 44 is configured to further categorize the connected vehicles RV into two groups, first grouped vehicles G1 and second grouped vehicles G2. The first grouped vehicles G1 are connected vehicles RV within a specified distance away from the host vehicle HV (for example, 20 m (about 65 feet)), whereas the second grouped vehicles G2 are connected vehicles RV outside the specified distance (i.e., vehicles 20 m or more away from the host vehicle HV). It should be noted that the non-connected vehicle RV between two first grouped vehicles G1 is not categorized as the first grouped vehicles G1 because the vehicle RV is not a connected vehicle. Similarly, the non-connected vehicle RV directly ahead of the front remote vehicle RV of the first grouped vehicles G1 is not categorized as the first nor second grouped vehicles G1, G2 because the vehicle RV is not a connected vehicle.

The determining section 44 is configured to monitor the first grouped vehicles G1 based on BSMs transmitted from the first grouped vehicles G1. Then, the determining section 44 identifies one of the first grouped vehicles G1, which starts moving first among the first grouped vehicles G1, as the specified vehicle SRV. The determining section 44 outputs the first signal upon determining that the specified vehicle SRV starts moving (i.e., one of the first grouped vehicles G1 starts moving first).

Next, operation of the DSRC system 10 according to the third embodiment will be described below with reference to FIG. 7. As with the first and second embodiments, the DSRC system 10 repeatedly performs the operation shown in the flowchart of FIG. 7 when (i) a traffic light 38 is red if there is the traffic light 38 and (ii) the host vehicle HV is stopped.

When the host vehicle HV stops in a queue before a traffic light 38 with a red color, the camera 34 detects the preceding vehicle PRV at Step 400 and the determining section 44 identifies the preceding vehicle PRV based on the captured images by the camera 34 at Step 410. Next, the determining section 44 categorizes the connected vehicles RV into the first grouped vehicles G1 and the second grouped vehicles G2 based on the positional information contained in the BSMs at Step 420.

Then, the determining section 44 monitors the first grouped vehicles G1 as to whether one of the first grouped vehicles G1 starts moving based on the BSMs transmitted from the first grouped vehicles G1 at Step 430. If one of the first grouped vehicles G1 starts moving (e.g., the front remote vehicle RV among the first grouped vehicles G1), the determining section 44 recognizes that the remote vehicle RV (i.e., the specified vehicle SRV) starts moving first (Step 430: Yes). Then, the determining section 44 outputs the first signal to the controlling section 46 at Step 440. If false at Step 430, the determining section 44 repeats Step 430 until one of the first grouped vehicles G1 starts moving. Then, the controlling section 46 performs the preliminary notification at Step 450. It should be noted the subsequent steps in this process is the same as Steps 270 to 320 to as shown in the flowchart of FIG. 5, the description of the subsequent steps are omitted by referring to the corresponding description of the second embodiment.

As described above, the DSRC system 10 according to the third embodiment notifies the driver when the traffic (the queue) is going to move as with the first and second embodiments. Therefore, the driver is able to prepare to start, and thus the host vehicle HV can move upon movement of the preceding vehicle PRV without substantial delay.

Other Embodiments

In the above-described second and third embodiments, the DSRC system 10 identifies the preceding vehicle PRV using the camera 34. However, the DSRC system 10 may use other sensors such as Lidar sensors or Radar sensors to detect the preceding vehicle PRVs, or may use a combination of the camera 34, the Lidar sensors and the Radar sensors.

In the above-described embodiments, the DSRC system 10 recognizes color of traffic lights (i.e., the traffic light status) using the camera 34. Alternatively, the DSRC system 10 may recognize the traffic light status through V2X communications. For example, the DSRC system 10 may recognize the traffic light status based on Signal Phase and Timing (SPaT) messages. The SPaT messages contain information, such as the current status of the traffic light (i.e., red, yellow, or green), and a signal change timing at which the next signal change will occur (i.e., green to yellow, yellow to red, red to green). Each of traffic lights may transmit the SPaT messages every 1000 ms, for example. Then, the DSRC system 10 recognizes the traffic light status when the DSRC radio 14 receives the SPaT messages from the traffic light. For example, the DSRC radio 14 receives the SPaT messages transmitted from a traffic light ahead of the host vehicle HV when the host vehicle HV reaches a range 1000 m away from the traffic light (i.e., the maximum communication range is 1000 m).

Figure 3:
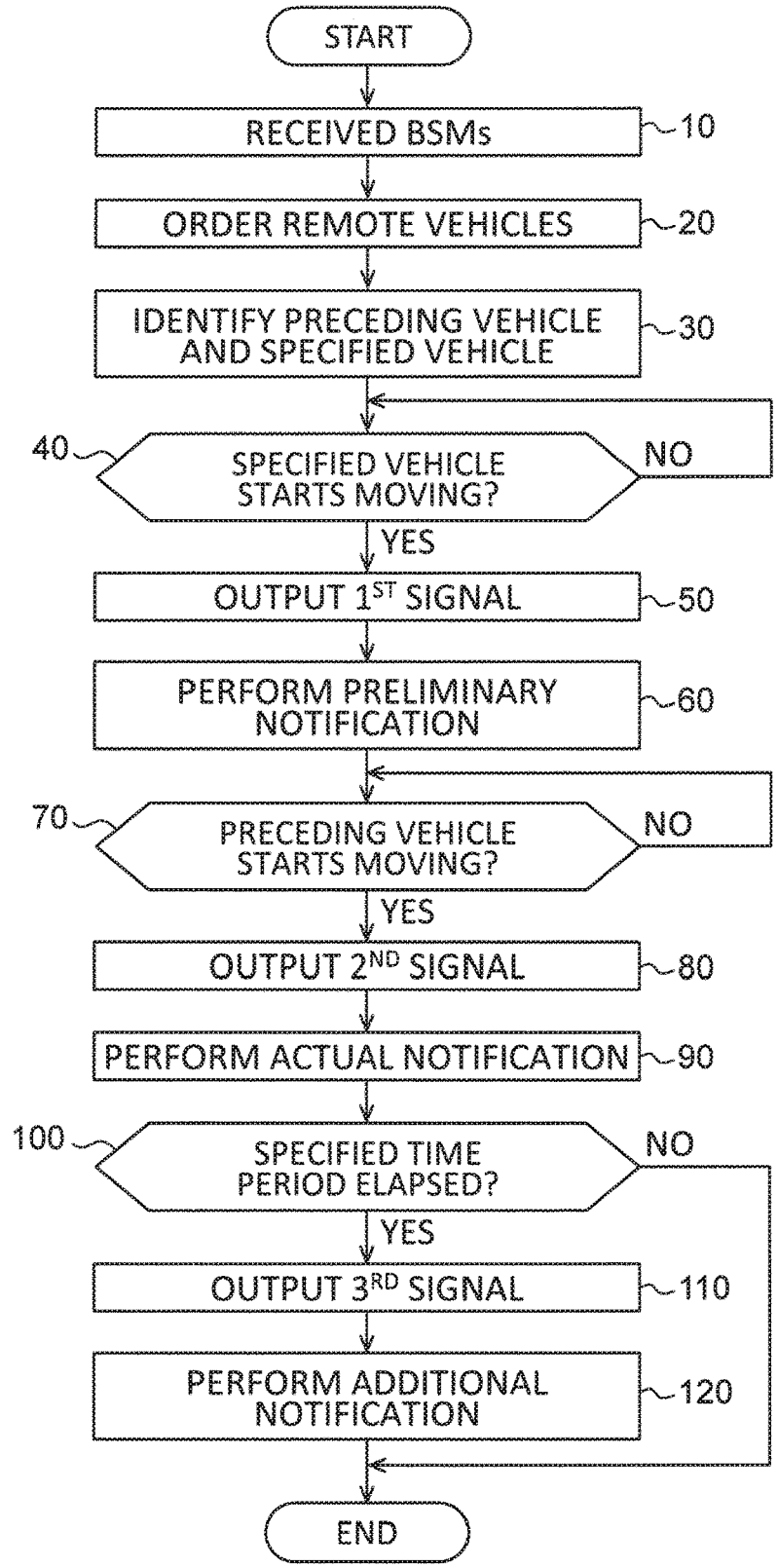
FIG. 3 is a flowchart of operation of the DRSC system according to the first embodiment.
Figure 5:
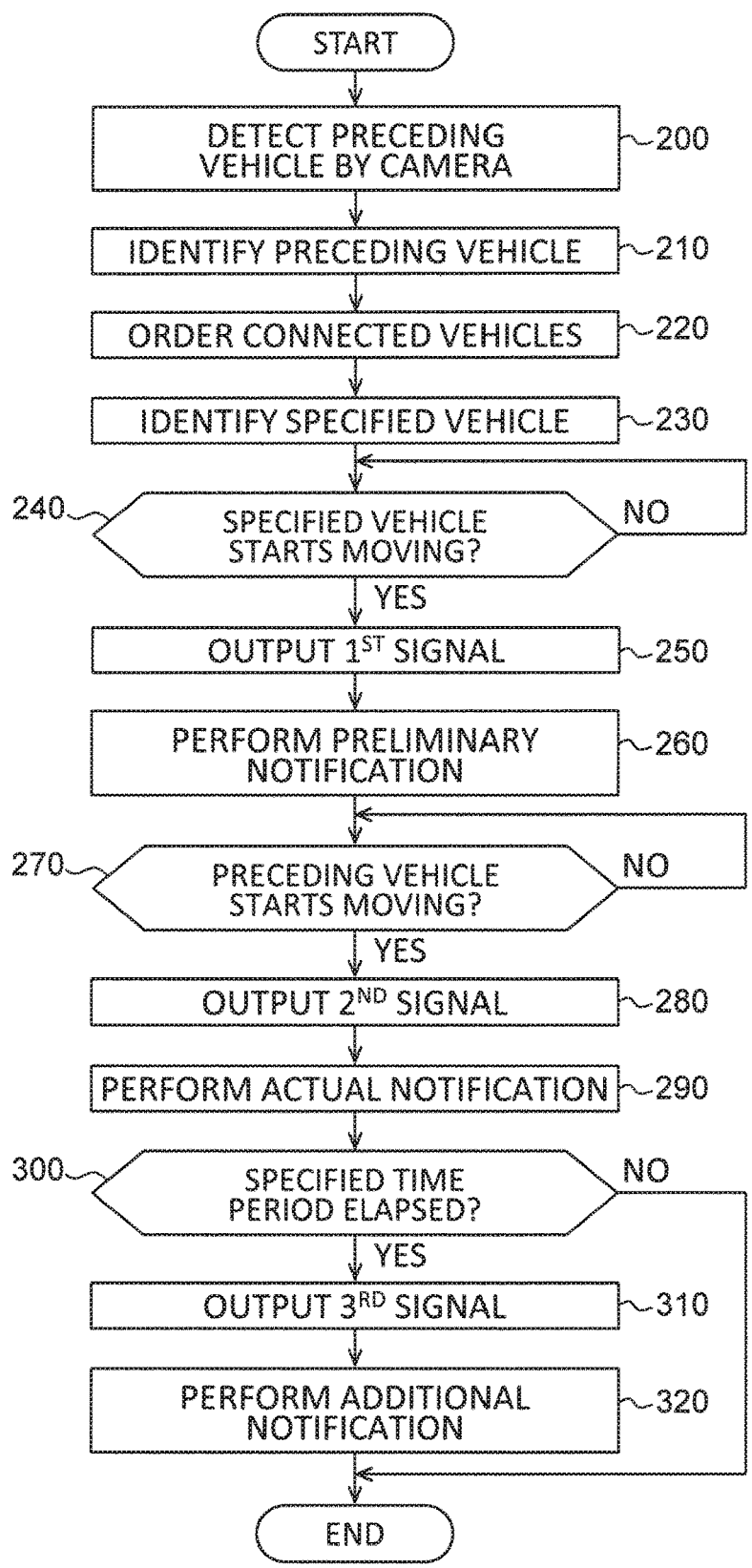
FIG. 5 is a flowchart of operation of the DRSC system according to the second embodiment.
Figure 7:
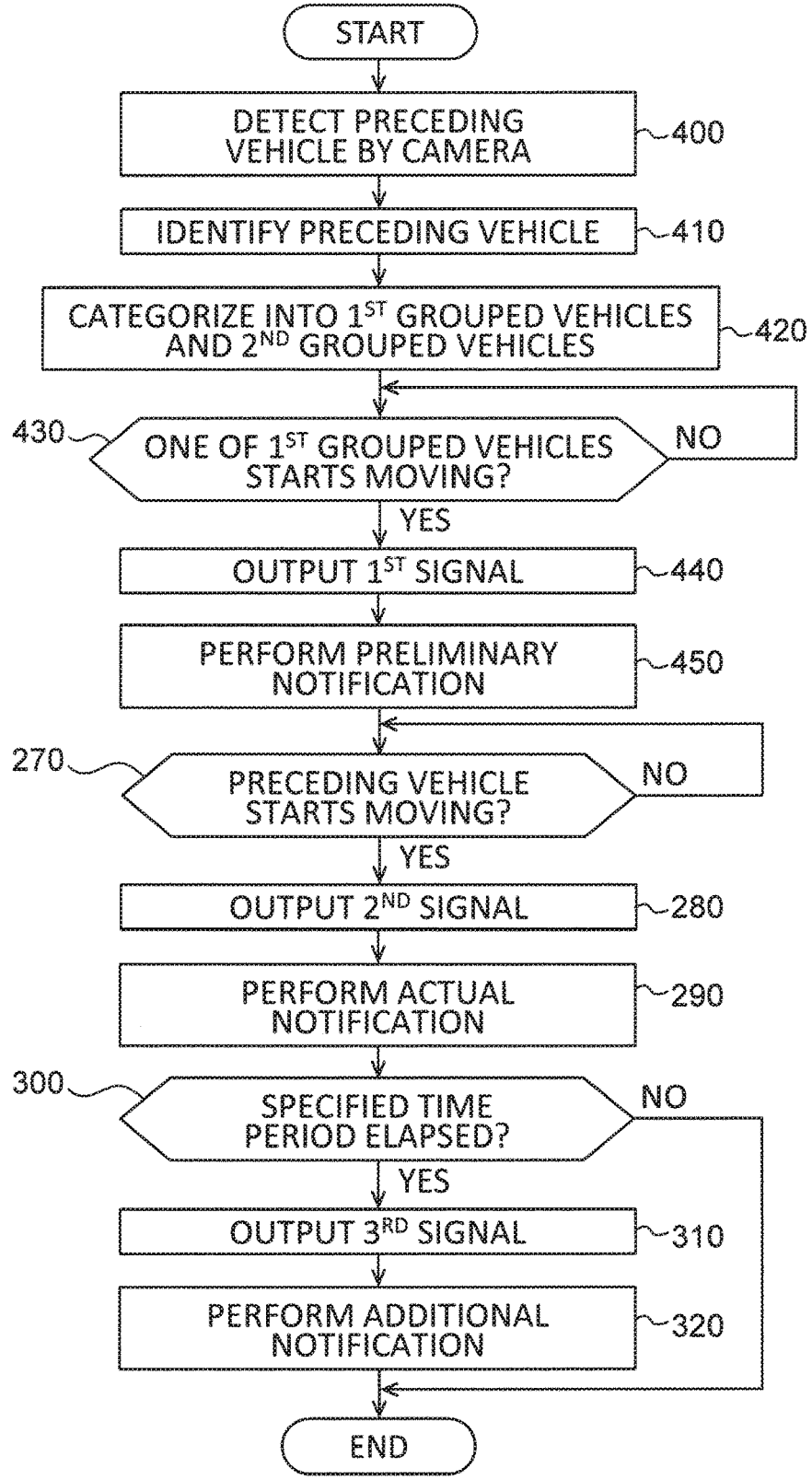
FIG. 7 is a flowchart of operation of the DRSC system according to the third embodiment.

It should be noted that although detecting a red color of the traffic light 38 is one requirement for the DSRC system 10 in the above-described embodiments to start operation shown in FIGS. 3, 5 and 7, this requirement is optional for the present disclosure and may be eliminated. That is, the DSRC system 10 may start the operation when the host vehicle HV stops in a queue. For example, the DSRC system 10 may start the operation when the host vehicle HV is stuck in traffic on a highway.

Furthermore, if the host vehicle HV is not equipped with the camera 34 or other sensors in such situation described in the second and third embodiments, the DSRC system 10 may identify the preceding vehicle PRV by only relying on the BSMs transmitted from the connected vehicles RV. In this case, the preceding vehicle PRV can be defined as "one of the connected vehicles RV that is closest to the host vehicle HV". Therefore, if the host vehicle HV stops directly behind a non-connected vehicle RV and one connected vehicle RV stops directly ahead of the non-connected vehicle RV in a queue, the DSRC system 10 will identify the connected vehicle RV as the preceding vehicle PRV. It should be noted that, in this situation, the DSRC system 10 should not perform the actual notification even if the preceding vehicle PRV starts moving. In other words, the DSRC system 10 may perform the actual notification only when the identified preceding vehicle PRV is located within a specified distance (e.g., 3 m) from the host vehicle HV so as to ensure that the preceding vehicle PRV is a vehicle actually directly ahead of the host vehicle HV.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

What is claimed is:

1. A system for providing a driver of a host vehicle being stopped with a preliminary notification that two or more remote vehicles forming a queue in front of the host vehicle are likely to start moving, the system comprising:
    a receiver configured to receive messages from the two or more remote vehicles through Vehicle-to-Vehicle (V2V) communications;
    a notifying device configured to provide the driver with the preliminary notification;
    a determiner configured to (i) identify a remote vehicle among the two or more remote vehicles that is directly ahead of the host vehicle as a preceding vehicle and a remote vehicle among the two or more remote vehicles that is not the preceding vehicle as a specified vehicle and (ii) determine whether the specified vehicle starts moving based on the messages sent from the specified vehicle; and
    a controller configured to control the notifying device to provide the preliminary notification when the determiner determines that the specified vehicle starts moving.

2. The system according to claim 1, wherein
    the determiner identifies, as the specified vehicle, a remote vehicle among the two or more remote vehicles that is directly ahead of the preceding vehicle.

3. The system according to claim 1, wherein
    the two or more remote vehicles include connected vehicles capable of communicating with the host vehicle through the V2V communications and non-connected vehicles not capable of communicating with the host vehicle, and the determiner identifies, as the specified vehicle, one of the connected vehicles that is closest to the host vehicle among the connected vehicles.

4. The system according to claim 1, wherein
the two or more remote vehicles include connected vehicles capable of communicating with the host vehicle through the V2V communications and non-connected vehicles not capable of communicating with the host vehicle,
the connected vehicles are grouped into first grouped vehicles within a specified distance away from the host vehicle and second grouped vehicles outside the specified distance away from the host vehicle, and
the determiner identifies, as the specified vehicle, one of the first grouped vehicles that starts moving first.

5. The system according to claim 1, wherein
the two or more remote vehicles include connected vehicles capable of communicating with the host vehicle through the V2V communications and non-connected vehicles not capable of communicating with the host vehicle,
the determiner determines, as the preceding vehicle, one of the connected vehicles,
the determiner is further configured to determine, based on the messages sent from the preceding vehicle, whether the preceding vehicle starts moving after the notifying device provided the preliminary notification, and
the controller controls the notifying device to provide the driver with an actual notification that the host vehicle should begin moving when the determiner determines that the preceding vehicle starts moving.

6. The system according to claim 5, wherein
the determiner is further configured to determine whether the host vehicle has not moved for a specified time period since the notifying device provided the actual notification, and
the controller controls the notifying device to provide the driver with an additional notification to urge the driver to start the host vehicle when the determiner determines that the host vehicle has not moved for the specified time period.

7. The system according to claim 6, wherein
the notifying device includes an audio system, and
the notifying device provides the driver with the additional notification by generating an additional notification sound from the audio system to the driver.

8. The system according to claim 5, wherein
the notifying device includes a display, and
the notifying device provides the driver with the actual notification by showing an actual notification image on the display to the driver.

9. The system according to claim 1, further comprising
a sensor obtaining information associated with the two or more remote vehicles, wherein
the determiner is further configured to determine, based on the information obtained by the sensor, whether the preceding vehicle starts moving after the notifying device provided the preliminary notification, wherein
the controller controls the notifying device to provide the driver with an actual notification that the host vehicle should begin moving when the determiner determines that the preceding vehicle starts moving.

10. The system according to claim 9, wherein
the determiner is further configured to determine whether the host vehicle has not moved for a specified time period since the notifying device provided the actual notification, and
the controller controls the notifying device to provide the driver with an additional notification to urge the driver to start the host vehicle when the determiner determines that the host vehicle has not moved for the specified time period.

11. The system according to claim 10, wherein
the notifying device includes an audio system, and
the notifying device provides the driver with the additional notification by generating an additional notification sound from the audio system to the driver.

12. The system according to claim 9, wherein
the notifying device includes a display, and
the notifying device provides the driver with the actual notification by showing an actual notification image on the display to the driver.

13. The system according to claim 1, wherein
the notifying device includes a display, and
the notifying device provides the driver with the preliminary notification by showing a preliminary notification image on the display to the driver.

14. A method for providing a driver of a host vehicle being stopped with a preliminary notification that two or more remote vehicles forming a queue in front of the host vehicle are likely to start moving, the method comprising a step of:
receiving, with a receiver, messages from the two or more remote vehicles through Vehicle-to-Vehicle (V2V) communications;
identifying a remote vehicle among the two or more remote vehicles that is directly ahead of the host vehicle as a preceding vehicle and a remote vehicle among the two or more remote vehicles that is not the preceding vehicle as a specified vehicle,
determining, with a determiner, whether the specified vehicle starts moving based on the messages sent from the specified vehicle; and
controlling, with a controller, a notifying device to provide the preliminary notification when the determiner determines that the specified vehicle starts moving.

15. The method according to claim 14, wherein
the determiner determines, as the specified vehicle, a remote vehicle among the two more remote vehicles that is directly ahead of the preceding vehicle.

16. The method according to claim 14, wherein
the two or more remote vehicles include connected vehicles capable of communicating with the host vehicle through the V2V communications and non-connected vehicles not capable of communicating with the host vehicle, and
the determiner determines, as the specified vehicle, one of the connected vehicles that is closest to the host vehicle among the connected vehicles.

17. The method according to claim 14, wherein
the two or more remote vehicles include connected vehicles capable of communicating with the host vehicle through the V2V communications and non-connected vehicles not capable of communicating with the host vehicle,
the connected vehicles are grouped into first grouped vehicles within a specified distance away from the host vehicle and second grouped vehicles outside the specified distance away from the host vehicle, and the determiner determines, as the specified vehicle, one of the first grouped vehicles that starts moving first.

18. The method according to claim 14, wherein the two or more remote vehicles include connected vehicles capable of communicating with the host vehicle through the V2V communications and non-connected vehicles not capable of communicating with the host vehicle, the determiner determines, as the preceding vehicle, one of the connected vehicles, the method further includes determining, with the determiner based on the messages sent from the preceding vehicle, whether the preceding vehicle starts moving after the notifying device provided the preliminary notification, and the controller controls the notifying device to provide the driver with an actual notification that the host vehicle should begin moving when the determiner determines that the preceding vehicle starts moving.

19. The method according to claim 18, further comprising determining, with the determiner, whether the host vehicle has not moved for a specified time period since the notifying device provided the actual notification, wherein the controller controls the notifying device to provide the driver with an additional notification to urge the driver to start the host vehicle when the determiner determines that the host vehicle has not moved for the specified time period.

20. The method according to claim 14, further comprising obtaining, with a sensor, information associated with the two or more remote vehicles, and determining, with the determiner based on the information obtained by the sensor, whether the preceding vehicle starts moving after the notifying device provided the preliminary notification, wherein the controller controls the notifying device to provide the driver with an actual notification that the host vehicle should begin moving when the determiner determines that the preceding vehicle starts moving.

\* \* \* \* \*